(12) United States Patent
Little et al.

(10) Patent No.: US 8,761,396 B2
(45) Date of Patent: *Jun. 24, 2014

(54) SYSTEM AND METHOD FOR SECURING DATA FOR REDIRECTING AND TRANSPORTING OVER A WIRELESS NETWORK

(75) Inventors: Herbert A. Little, Waterloo (CA); Michael K. Brown, Kitchener (CA); Jonathan F. Hammell, Dobbinton (CA); Michael S. Brown, Waterloo (CA); Michael G. Kirkup, Waterloo (CA); Neil P. Adams, Waterloo (CA)

(73) Assignee: BlackBerry Limited (CA)

( * ) Notice: Subject to any disclaimer, the term of this patent is extended or adjusted under 35 U.S.C. 154(b) by 49 days.

This patent is subject to a terminal disclaimer.

(21) Appl. No.: 13/355,228

(22) Filed: Jan. 20, 2012

(65) Prior Publication Data

US 2012/0191978 A1 Jul. 26, 2012

Related U.S. Application Data

(63) Continuation of application No. 10/984,331, filed on Nov. 9, 2004, now Pat. No. 8,130,957.

(60) Provisional application No. 60/566,771, filed on Apr. 30, 2004.

(51) Int. Cl.
*H04L 29/06* (2006.01)

(52) U.S. Cl.
USPC ............ 380/270; 380/277; 380/247; 713/153

(58) Field of Classification Search
USPC .................. 713/176, 166, 171, 169, 170, 153; 726/11, 12, 13; 380/270, 282, 277, 380/278, 247, 273
See application file for complete search history.

(56) References Cited

U.S. PATENT DOCUMENTS

| | | | |
|---|---|---|---|
| 5,243,649 A | 9/1993 | Franson | |
| 5,553,145 A * | 9/1996 | Micali | ............................. 380/30 |

(Continued)

FOREIGN PATENT DOCUMENTS

| | | |
|---|---|---|
| CA | 2565360 C | 1/2012 |
| HK | 1099863 | 5/2011 |
| WO | WO-05107128 A1 | 11/2005 |

OTHER PUBLICATIONS

"2.4GHz 54Mbps Wireless-G Broadband Router User Guide", Linksys, 2003, (2003).

(Continued)

*Primary Examiner* — David Garcia Cervetti
(74) *Attorney, Agent, or Firm* — Schwegman Lundberg & Woessner, P.A.

(57) ABSTRACT

A system and method for securing data for redirecting and transporting over a wireless network are generally described herein. In accordance with some embodiments, when it is determined that an electronic message that is protected with a first encryption algorithm is to be transported over a wireless network to a wireless device, the electronic message is converted to a data structure that is recognizable by the wireless device and the data structure is encrypted with a second encryption algorithm using a random session key. The second encryption algorithm has a stronger security than the first encryption algorithm. The random session key is encrypted with a public key and packets that comprise the encrypted data structure and the encrypted random session key are transmitted to the wireless device over the wireless network.

21 Claims, 8 Drawing Sheets

(56) References Cited

U.S. PATENT DOCUMENTS

| | | | |
|---|---|---|---|
| 5,615,261 A | 3/1997 | Grube et al. | |
| 5,892,900 A | 4/1999 | Ginter et al. | |
| 5,926,546 A | 7/1999 | Maeda et al. | |
| 6,085,168 A * | 7/2000 | Mori et al. | 705/17 |
| 6,401,113 B2 * | 6/2002 | Lazaridis et al. | 709/207 |
| 6,567,914 B1 | 5/2003 | Just et al. | |
| 6,580,906 B2 | 6/2003 | Bilgic et al. | |
| 6,584,564 B2 * | 6/2003 | Olkin et al. | 713/152 |
| 6,725,104 B2 * | 4/2004 | Lo et al. | 700/65 |
| 6,754,470 B2 * | 6/2004 | Hendrickson et al. | 455/67.11 |
| 6,804,707 B1 * | 10/2004 | Ronning | 709/220 |
| 6,904,521 B1 * | 6/2005 | Jivsov | 713/155 |
| 6,934,533 B2 | 8/2005 | Joyce et al. | |
| 6,970,446 B2 | 11/2005 | Krischer et al. | |
| 6,981,023 B1 * | 12/2005 | Hamilton et al. | 709/206 |
| 6,988,199 B2 * | 1/2006 | Toh et al. | 713/170 |
| 7,082,536 B2 * | 7/2006 | Filipi-Martin et al. | 713/171 |
| 7,107,247 B2 | 9/2006 | Kinoshita et al. | |
| 7,146,009 B2 * | 12/2006 | Andivahis et al. | 380/277 |
| 7,162,647 B2 * | 1/2007 | Osaki | 713/193 |
| 7,174,368 B2 * | 2/2007 | Ross, Jr. | 709/207 |
| 7,178,724 B2 * | 2/2007 | Tamagno et al. | 235/380 |
| 7,196,807 B2 * | 3/2007 | Goldstone | 358/1.15 |
| 7,240,220 B2 * | 7/2007 | Osaki | 713/193 |
| 7,242,766 B1 * | 7/2007 | Lyle | 380/2 |
| 7,243,233 B2 | 7/2007 | Kindberg et al. | |
| 7,251,728 B2 * | 7/2007 | Toh et al. | 713/156 |
| 7,254,712 B2 * | 8/2007 | Godfrey et al. | 713/176 |
| 7,277,549 B2 * | 10/2007 | Olkin et al. | 380/277 |
| 7,281,269 B1 * | 10/2007 | Sievers et al. | 726/24 |
| 7,293,171 B2 * | 11/2007 | Batthish et al. | 713/152 |
| 7,325,127 B2 * | 1/2008 | Olkin et al. | 713/152 |
| 7,376,968 B2 | 5/2008 | Ritz et al. | |
| 7,401,356 B2 * | 7/2008 | Bandini et al. | 726/14 |
| 7,472,051 B2 * | 12/2008 | Mariani et al. | 703/13 |
| 7,600,121 B2 * | 10/2009 | Davin | 713/176 |
| 7,653,815 B2 * | 1/2010 | Godfrey et al. | 713/176 |
| 7,706,528 B2 * | 4/2010 | Futa et al. | 380/28 |
| 7,774,618 B2 * | 8/2010 | Osaki | 713/190 |
| 7,827,406 B2 * | 11/2010 | Brown et al. | 713/170 |
| 8,020,201 B2 * | 9/2011 | Adusumilli et al. | 726/12 |
| 2002/0034305 A1 | 3/2002 | Noyama et al. | |
| 2002/0049818 A1 | 4/2002 | Gilhuly et al. | |
| 2002/0053019 A1 * | 5/2002 | Ruttan et al. | 713/152 |
| 2002/0076053 A1 * | 6/2002 | Hachimura | 380/277 |
| 2002/0101998 A1 | 8/2002 | Wong et al. | |
| 2002/0106079 A1 | 8/2002 | Mauro et al. | |
| 2002/0112168 A1 * | 8/2002 | Filipi-Martin et al. | 713/183 |
| 2002/0129238 A1 * | 9/2002 | Toh et al. | 713/153 |
| 2002/0143885 A1 * | 10/2002 | Ross, Jr. | 709/207 |
| 2002/0199096 A1 * | 12/2002 | Wenocur et al. | 713/153 |
| 2003/0046533 A1 * | 3/2003 | Olkin et al. | 713/152 |
| 2003/0081783 A1 * | 5/2003 | Adusumilli et al. | 380/270 |
| 2003/0115448 A1 * | 6/2003 | Bouchard | 713/153 |
| 2003/0195967 A1 * | 10/2003 | Selgas et al. | 709/228 |
| 2003/0195968 A1 * | 10/2003 | Selgas et al. | 709/228 |
| 2003/0204606 A1 * | 10/2003 | Selgas et al. | 709/228 |
| 2003/0233414 A1 * | 12/2003 | Henry | 709/206 |
| 2004/0015592 A1 * | 1/2004 | Selgas et al. | 709/224 |
| 2004/0030752 A1 * | 2/2004 | Selgas et al. | 709/206 |
| 2004/0032624 A1 * | 2/2004 | Stevens et al. | 358/402 |
| 2004/0053601 A1 | 3/2004 | Frank et al. | |
| 2004/0196978 A1 * | 10/2004 | Godfrey et al. | 380/270 |
| 2004/0196979 A1 | 10/2004 | Cheng et al. | |
| 2005/0036622 A1 | 2/2005 | Hay et al. | |
| 2005/0114652 A1 * | 5/2005 | Swedor et al. | 713/156 |
| 2005/0114664 A1 * | 5/2005 | Davin | 713/170 |
| 2005/0160292 A1 * | 7/2005 | Batthish et al. | 713/201 |
| 2005/0163320 A1 * | 7/2005 | Brown et al. | 380/270 |
| 2005/0198170 A1 * | 9/2005 | LeMay et al. | 709/206 |
| 2005/0204154 A1 * | 9/2005 | Osaki | 713/193 |
| 2005/0210246 A1 * | 9/2005 | Faure | 713/167 |
| 2005/0244007 A1 | 11/2005 | Little et al. | |
| 2006/0031364 A1 * | 2/2006 | Hamilton et al. | 709/206 |
| 2006/0053280 A1 * | 3/2006 | Kittle et al. | 713/156 |
| 2006/0064604 A1 * | 3/2006 | Osaki | 713/193 |
| 2006/0265498 A1 | 11/2006 | Turgeman et al. | |
| 2006/0291455 A1 | 12/2006 | Katz et al. | |
| 2007/0172066 A1 * | 7/2007 | Davin | 380/262 |
| 2007/0300079 A1 * | 12/2007 | Osaki | 713/190 |
| 2008/0044023 A1 * | 2/2008 | Zorea et al. | 380/270 |
| 2008/0044029 A1 | 2/2008 | Gilhuly et al. | |
| 2008/0046528 A1 | 2/2008 | Gilhuly et al. | |
| 2008/0097946 A1 | 4/2008 | Oliver et al. | |
| 2008/0270789 A1 * | 10/2008 | Bandini et al. | 713/156 |
| 2009/0074190 A1 * | 3/2009 | Osaki | 380/277 |
| 2009/0276626 A1 * | 11/2009 | Lazaridis et al. | 713/168 |
| 2010/0115264 A1 * | 5/2010 | Godfrey et al. | 713/153 |
| 2010/0124333 A1 * | 5/2010 | Godfrey et al. | 380/270 |
| 2011/0010561 A1 * | 1/2011 | Osaki | 713/189 |
| 2011/0154019 A1 * | 6/2011 | Wang | 713/153 |
| 2011/0296167 A1 * | 12/2011 | Adusumilli et al. | 713/152 |

OTHER PUBLICATIONS

"U.S. Appl. No. 10/984,331, Response filed Jul. 27, 2011 to Non Final Office Action mailed Apr. 27, 2011", 10 pgs.

"U.S. Appl. No. 10/984,331, Examiner Interview Summary mailed Apr. 23, 2009", 3 pgs.

"U.S. Appl. No. 10/984,331, Examiner Interview Summary mailed Dec. 17, 2008", 3 pgs.

"U.S. Appl. No. 10/984,331, Final Office Action mailed Apr. 24, 2009", 27 pgs.

"U.S. Appl. No. 10/984,331, Final Office Action mailed Jun. 17, 2010", 30 pgs.

"U.S. Appl. No. 10/984,331, Non Final Office Action mailed Jan. 6, 2010", 30 pgs.

"U.S. Appl. No. 10/984,331, Non Final Office Action mailed Aug. 13, 2008", 16 pgs.

"U.S. Appl. No. 10/984,331, Non Final Office Action mailed Nov. 19, 2010", 31 pgs.

"U.S. Appl. No. 10/984,331, Non Final Office Action mailed Apr. 27, 2011", 16 pgs.

"U.S. Appl. No. 10/984,331, Notice of Allowance mailed Oct. 17, 2011", 12 pgs.

"U.S. Appl. No. 10/984,331, Response filed May 6, 2010 to Non Final Office Action mailed Jan. 6, 2010", 8 pgs.

"U.S. Appl. No. 10/984,331, Response filed Oct. 7, 2010 to Final Office Action mailed Jun. 17, 2010", 10 pgs.

"U.S. Appl. No. 10/984,331, Response filed Oct. 26, 2009 to Final Office Action mailed Apr. 24, 2009", 7 pgs.

"U.S. Appl. No. 10/984,331, Response filed Dec. 18, 2008 to Non Final Office Action mailed Aug. 13, 2008", 10 pgs.

"U.S. Appl. No. 10/984,331, Response filed Feb. 18, 2011 to Non Final Office Action mailed Nov. 19, 2010", 10 pgs.

"U.S. Appl. No. PCT/CA2004/001938, International Search Report mailed Mar. 11, 2005", 14 pgs.

"Canadian Application Serial No. 2,565,360, Notice of Allowance mailed May 12, 2011", 1 Pg.

"Canadian Application Serial No. 2,565,360, Office Action mailed Apr. 8, 2010", 3 pgs.

Jian, et al., "CDMA physical layer built-in security enhancement", IEEE vol. 3, (Oct. 2003), 2157-2161.

LINKSYS, "2.4 GHz 54 Mbps Wireless-G Broadband Router User Guide", (2003).

* cited by examiner

SYSTEM AND METHOD FOR SECURING DATA FOR REDIRECTING AND TRANSPORTING OVER A WIRELESS NETWORK

PRIORITY APPLICATIONS

This application is a continuation of U.S. application Ser. No. 10/984,331, filed Nov. 9, 2004, now issued as U.S. Pat. No. 8,130,957, which claims the benefit of U.S. Provisional Application Ser. No. 60/566,771, filed on Apr. 30, 2004, the entire disclosures of which are incorporated herein by reference in their entirety.

FIELD

The technology described in this patent document relates generally to the field of data encryption. More particularly, the patent document describes a system and method for securing data for transmission to a wireless device.

BACKGROUND

Systems for encrypting electronic messages and other data are known in this field. Often, electronic messages are transmitted over unsecured networks that are merely digitally signed or encrypted with a weak encryption algorithm, such as Triple DES. In many instances, this level of security may not be sufficient.

SUMMARY

In accordance with the teachings described herein, systems and methods are provided for securing data for transmission to a wireless device. The disclosed systems and methods may include an electronic messaging system used to send and receive data over a first network and also used to forward data to a wireless device operable in a second network. The electronic messaging system may receive an electronic message encrypted with a first encryption algorithm and addressed to a message recipient in the first network, the message recipient having an associated wireless device operable in the second network. The electronic messaging system may determine that the electronic message is to be transported across the second network to the wireless device, and in response to determining that the electronic message is to be transported across the second network, encrypt the electronic message using a second encryption algorithm and transmit the encrypted message over the second network to the wireless device, with the second encryption algorithm being a stronger encryption algorithm than the first encryption algorithm.

DETAILED DESCRIPTION

Figure 1:
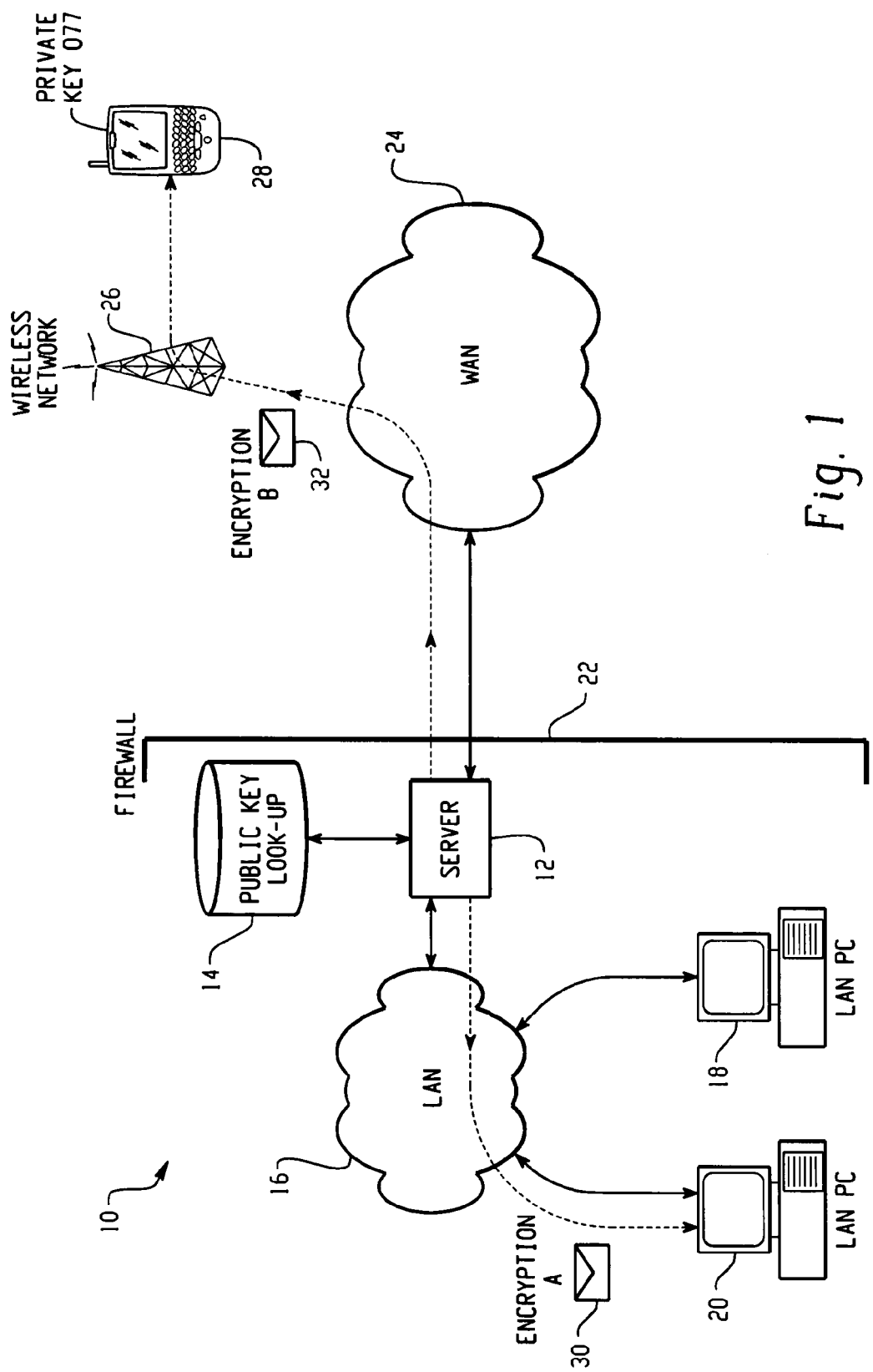
FIG. 1 is a block diagram of an example system for securing data for transmission to a wireless device.

With reference now to the drawing figures, FIG. 1 is a block diagram of an example system 10 for securing data for transmission to a wireless device 28. The system 10 includes an electronic messaging server 12, a public key look-up database 14 and a plurality of computers 18, 20 that communicate over a local area network (LAN) 16. Also illustrated are a wide area network (WAN) 24, a wireless network 26 and the wireless device 28. The system components 12, 14, 18, 20 that communicate over the LAN 16 are isolated from the WAN 24 and wireless network 26 by a firewall 22.

The electronic messaging server 12 is operable to send and receive electronic messages and other data over the LAN 16 within the protection of the firewall 22 and also outside the firewall 22 over the WAN 24. In addition, electronic messages and other data may be transmitted between the server 12 and the wireless device 28 via the WAN 24 and wireless network 26.

In operation, the system 10 uses various encryption algorithms 30, 32 to encrypt electronic messages or other data depending upon whether the data is being sent within the security of the firewall 22 or over the wireless network 26 to a wireless device 28. Messages 30 sent between computers 18, 20 on the secure LAN 16 may be encrypted with a weak encryption algorithm (Encryption A), or may be merely digitally signed or even left un-encrypted. However, if an electronic message or other data is to be transmitted outside of the security of the firewall 22 to a wireless device 28, then the electronic messaging server 12 may further encrypt the outgoing message 32 using a stronger encryption algorithm (Encryption B). This stronger encryption algorithm (Encryption B) is used to encrypt the weakly encrypted, digitally signed or unencrypted message 30, thereby providing an additional layer of protection. Preferably, the outgoing message 32 is encrypted using a strong symmetric algorithm, such as AES-256.

In order to encrypt an outgoing message 32 to the wireless device 28, the electronic messaging server 12 may access the public key look-up database 14 to identify a public encryption key for the message recipient associated with the wireless device 28. The outgoing message 32 is encrypted using a randomly generated session key and the strong symmetric encryption algorithm. The randomly generated session key used for the strong symmetric encryption is then encrypted using the public encryption key. The encrypted message 32 and the encrypted session key may then be securely transmitted over the WAN 24 and wireless network 26. The encrypted session key is then decrypted using a private encryption key stored on the wireless device 28 and is then used to decrypt the message 32. Electronic messages 32 received by the wireless device 28 may preferably be stored in encrypted format and decrypted only when accessed by application software executing on the device 28.

Figure 2:
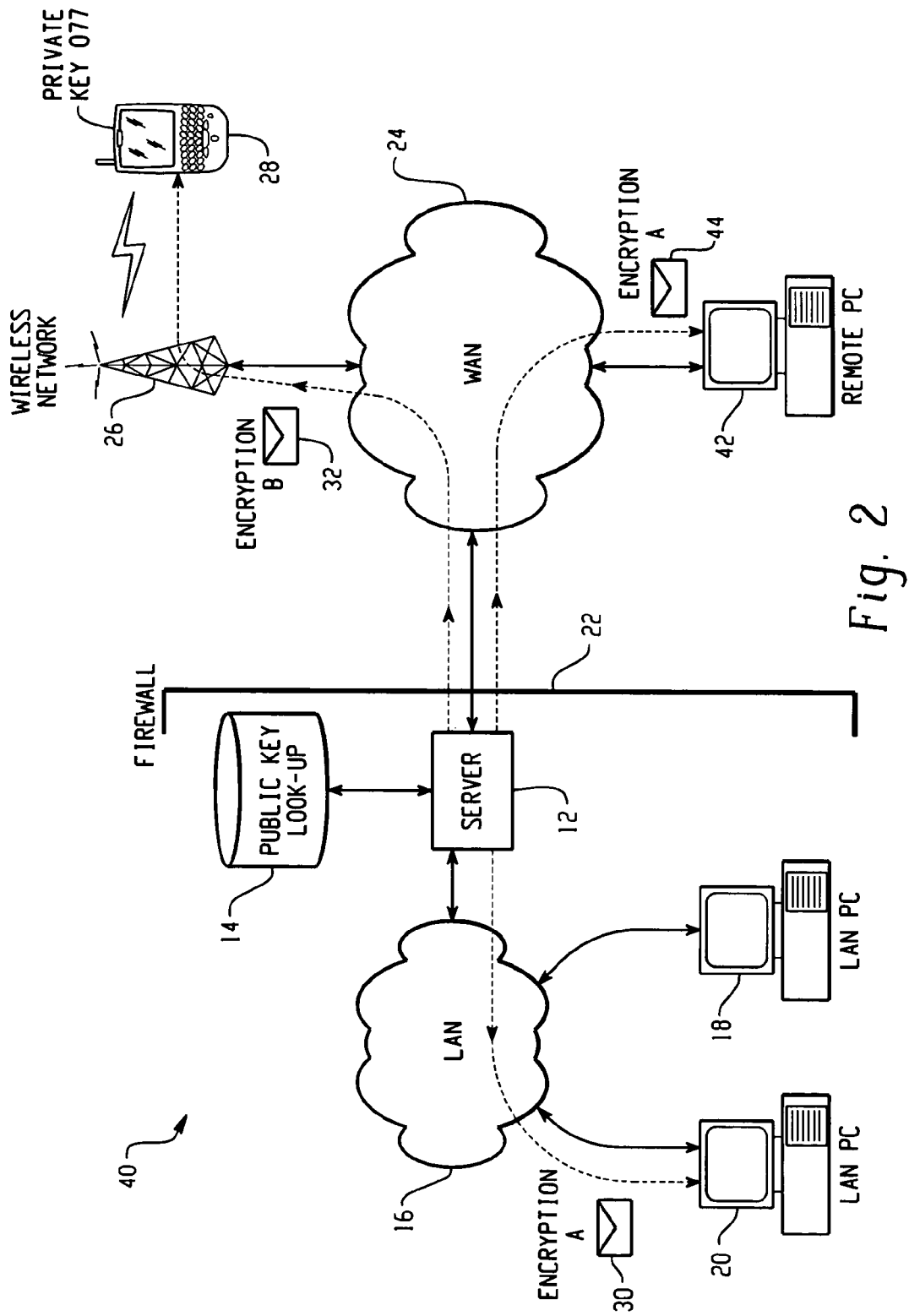
FIGS. 2 and 3 are block diagrams illustrating the transmission of data outside of the security of a firewall to a device on a wide area network (WAN)
Figure 3:
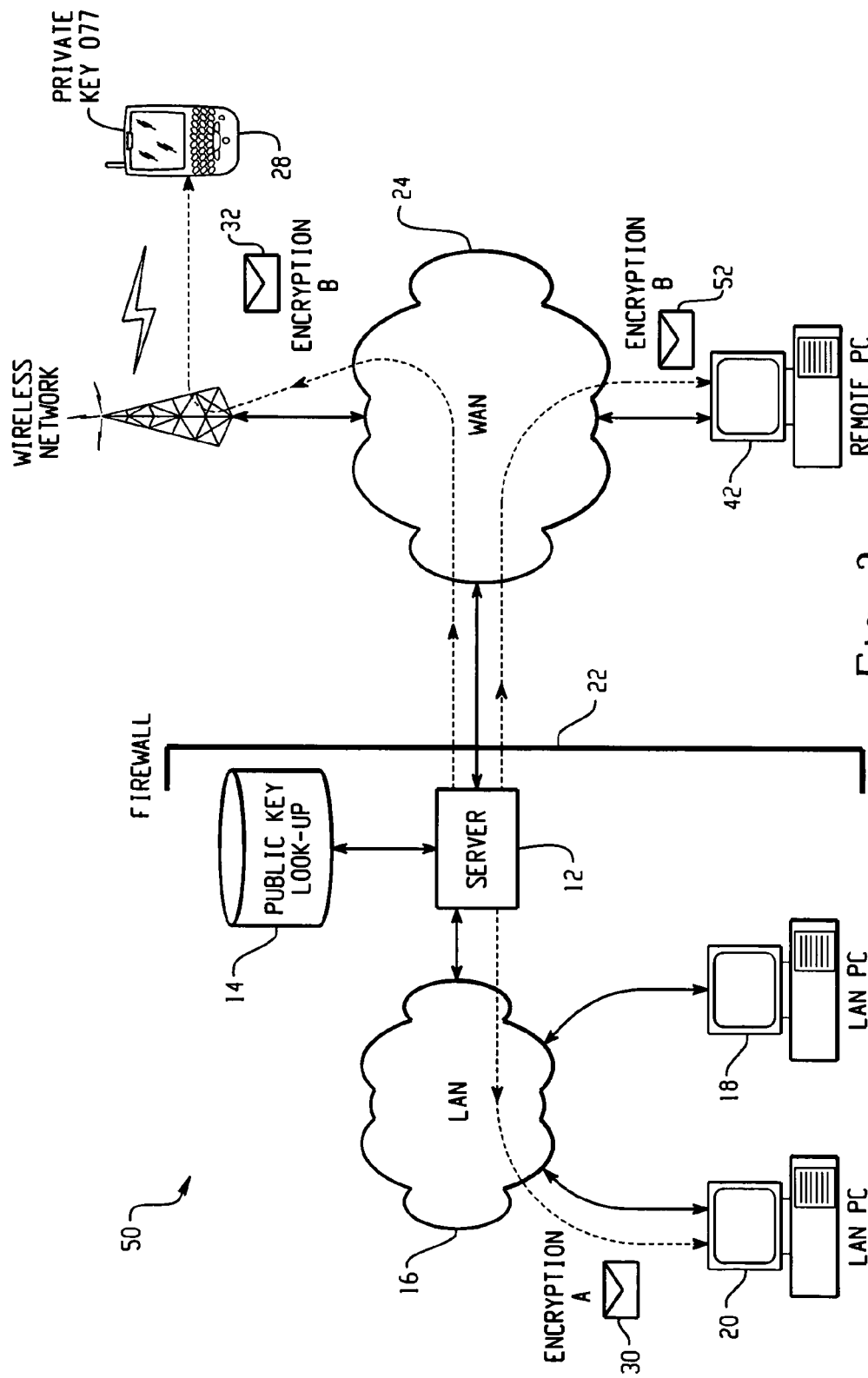

FIGS. 2 and 3 are block diagrams 40, 50 illustrating the transmission of data 44, 52 outside of the security of the firewall 22 to a device 42 on the WAN 24. As illustrated in FIG. 2, a stronger encryption algorithm (Encryption B) may be utilized when messages 32 or other data are routed over the wireless network to the wireless device 28, while a weaker algorithm (Encryption A) is utilized when messages 30, 44 are sent to devices 18, 20, 42 on the LAN 16 or WAN 24. The embodiment 40 of FIG. 2 may, for example, be implemented because security over the wireless network 26 is of greater concern than security over the WAN 24, because the software for forwarding messages 32 over the wireless network 26 is created by a different entity than the software for sending and receiving messages over the LAN 16 and WAN 24, or for other reasons. In another example embodiment illustrated in FIG. 3, the stronger encryption algorithm (Encryption B) may be utilized for all messages 32, 52 sent outside of the security of the firewall 22, while a weaker algorithm (Encryption A) is utilized only for messages 30 send over the LAN 16.

Figure 4:
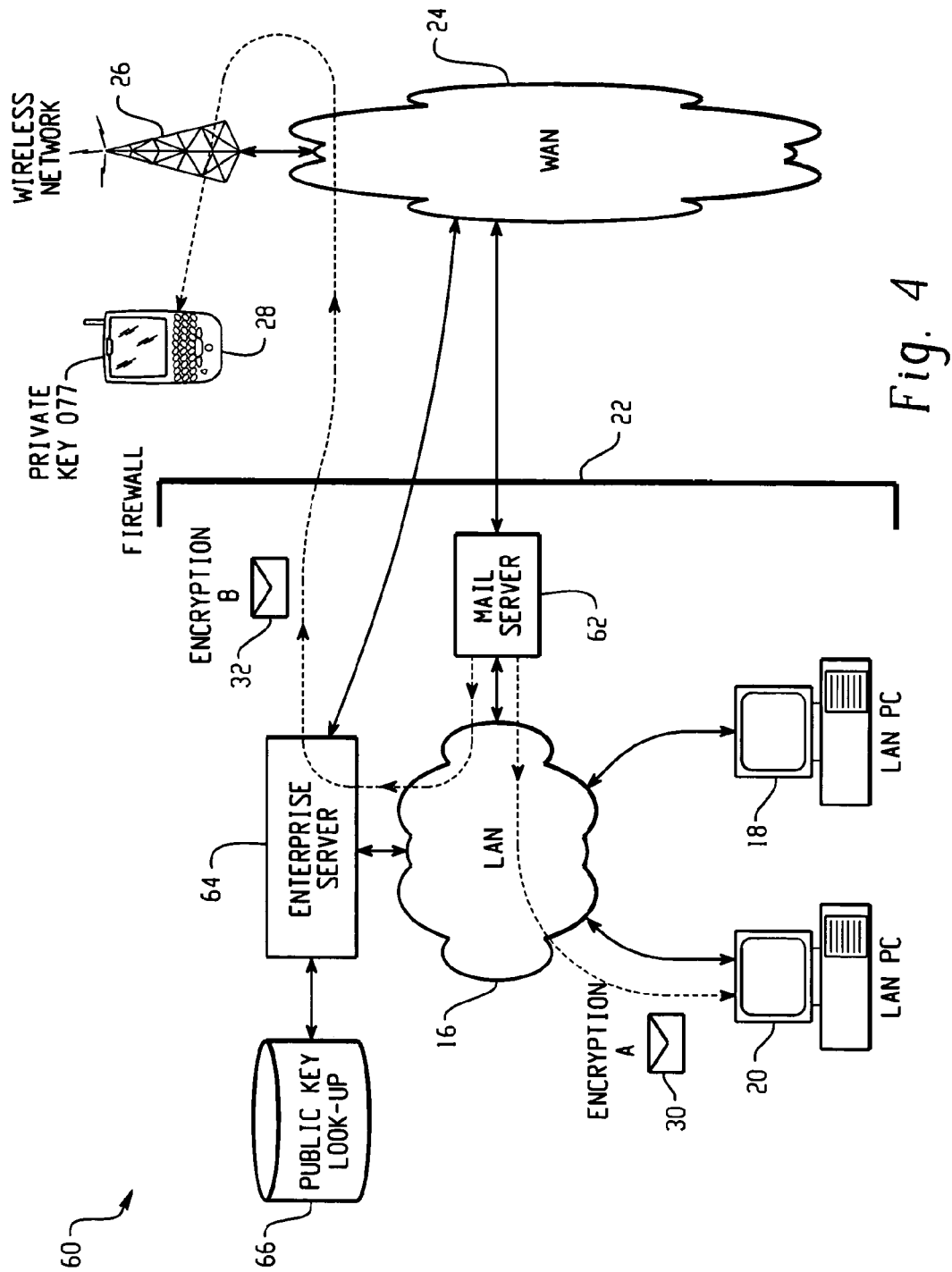
FIG. 4 is a block diagram of another example system for securing data for transmission to a wireless device.

FIG. 4 is a block diagram of another example system 70 for securing data for transmission to a wireless device 28. This system 70 is similar to the system 10 of FIG. 1, except that transmissions to and from the wireless device 28 are controlled by an enterprise server 64. An example of an enterprise server 64 is described below with reference to FIG. 7. In operation, messages 32 or other data that are received by the mail server 62 and are designated for delivery to a wireless device 28 associated with a message recipient are detected by the enterprise server 64. The enterprise server 64 then accesses the public key look-up database 66 to identify a public encryption key associated with the message recipient associated with the wireless device 28. A randomly generated session key is used to encrypt the outgoing message 32 with a stronger symmetric algorithm, such as AES-256 (e.g., instead of Triple DES.). The randomly generated session key is encrypted using the public encryption key and is then transmitted with the encrypted message 32, over the WAN 24 and wireless network 26 to the wireless device 28. The session key may then be decrypted using a private encryption key stored on the wireless device, and is then used to decrypt the message 32. Preferably, the message 32 is stored on the wireless device 28 in encrypted format, and is only decrypted when accessed by a software application executing on the device 28.

Preferably, data 32 being transmitted to the wireless device 28 may be first converted by the enterprise server 64 into a data structure that is recognized by the device 28, and then encrypted using the strong encryption algorithm (Encryption B.) The wireless device 28 may then decrypt the data structure when it receives instructions to display the data 32. In this manner, the data 32 does not have to go through a decrypt and recrypt process once it is received by the device 28.

In one embodiment, the enterprise server 64 may be further operable to distinguish between classified and unclassified messages 32, wherein only classified messages are further encrypted using the stronger encryption algorithm (Encryption B.) Unclassified messages may be encrypted using a weaker encryption algorithm (Encryption A), or may be merely digitally signed or even left un-encrypted, similar to messages 30 sent over the LAN 16. The enterprise server 64 may, for example, distinguish between classified and unclassified messages by examining one or more of the message fields (e.g., subject line, message body, etc.) for a designated keyword or keyphrase. If the designated keyword or keyphrase is identified, then the message may be treated as a classified message. In another example, the enterprise server 64 may distinguish between classified and unclassified messages based on where the message originated, for example by examining the sender field of the message. For instance, messages from an internal address (e.g., a message originating from within the firewall 22) may always be encrypted using the stronger algorithm (Encryption B), while emails from an external address may be encrypted using a weaker algorithm (Encryption A) or left unencrypted.

Figure 5:
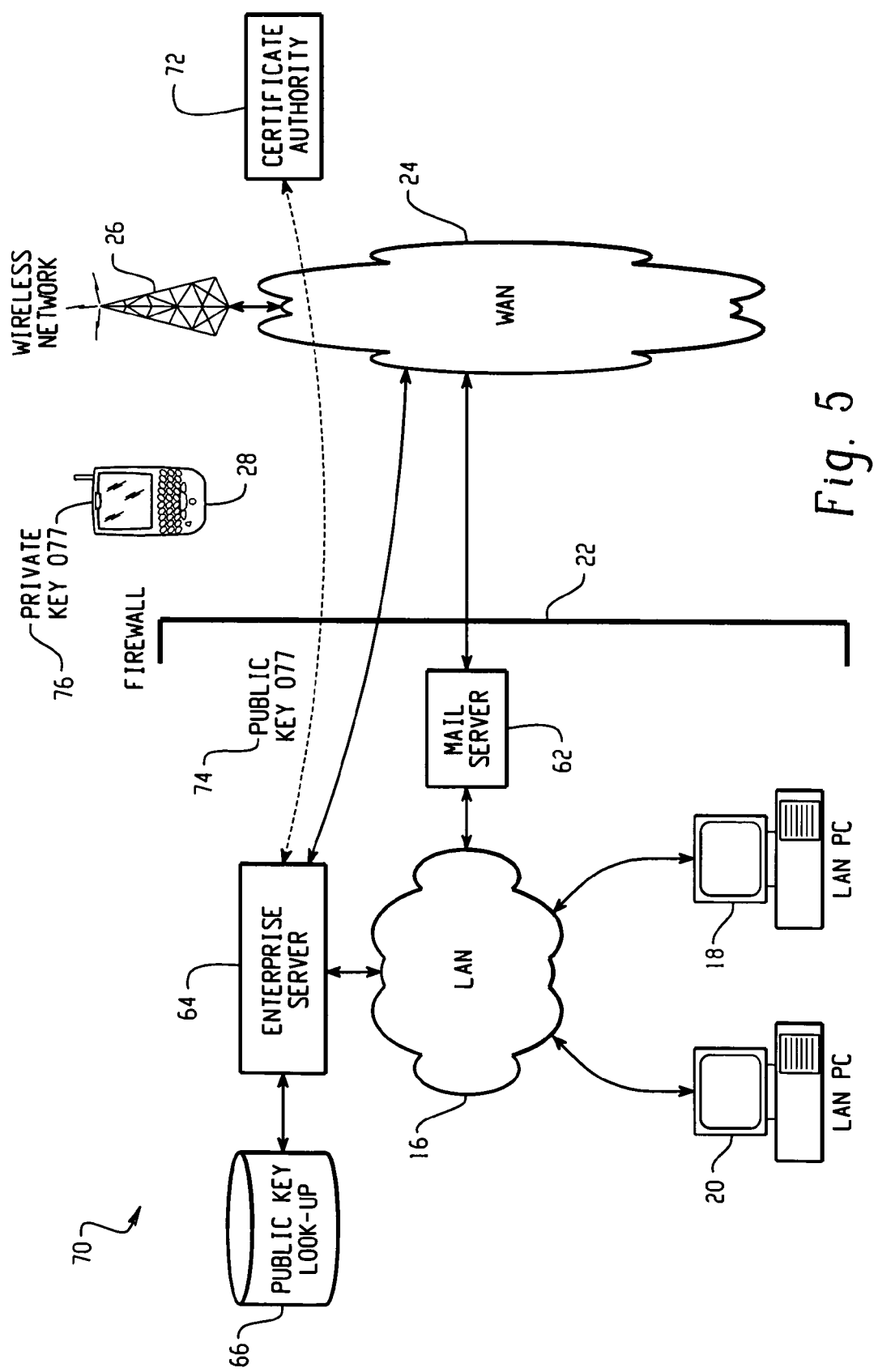
FIG. 5 is a block diagram illustrating the access of a public encryption key from a certificate authority.

As illustrated in FIG. 5, the public key 74 that is used to encrypt messages 32 outgoing to the wireless device 28 may be accessed from a certificate authority 72. The enterprise server 64 may, for example, access the certificate authority 72 over the WAN 24 to retrieve the current public key 74 for any message recipient associated with wireless devices 28 registered with the enterprise server 64. The enterprise server 64 may then store the public keys 74 in the public key look-up database 66 for quick access when encrypting an outgoing message. In another embodiment, the system 70 may not utilize a public key look-up database 66, and may instead store the public keys 74 on the enterprise server 64 or access the certificate authority 72 for the public key 74 each time the public key 74 is needed.

Figure 6:
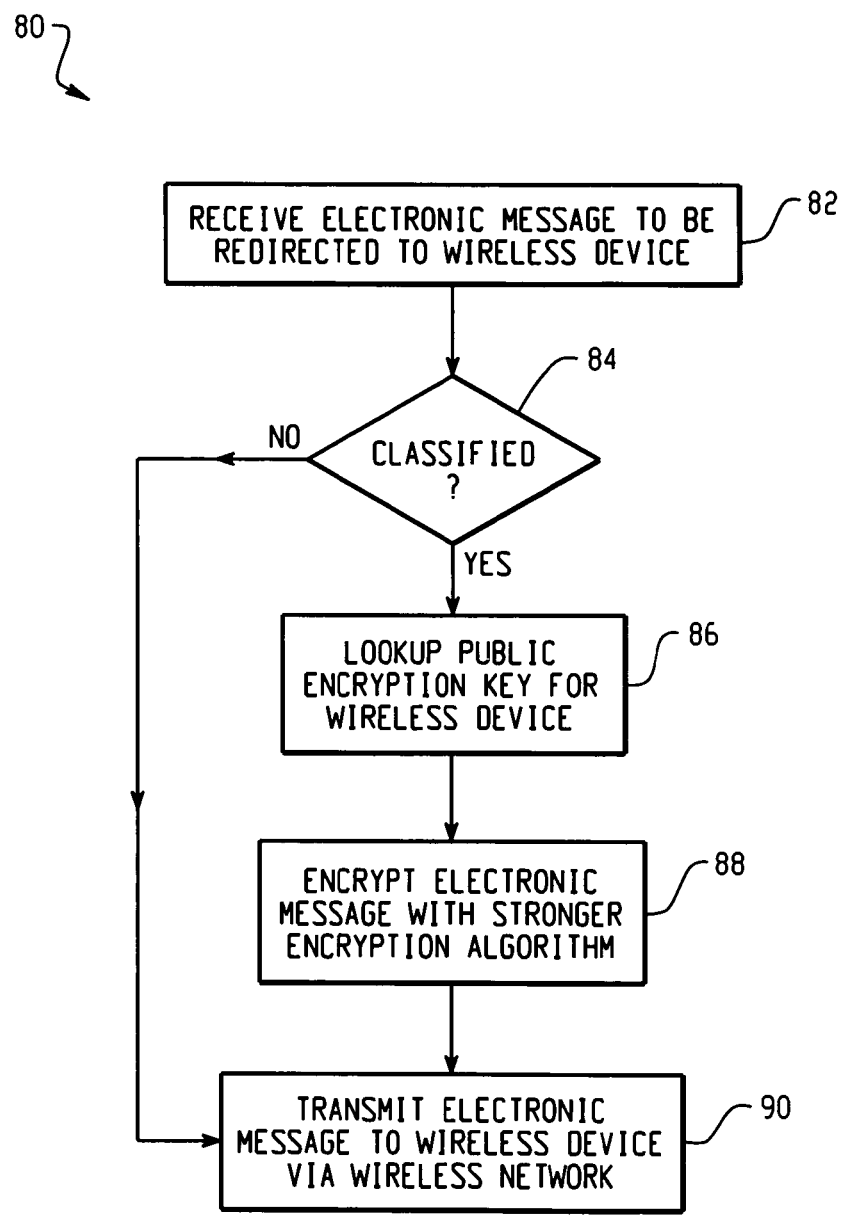
FIG. 6 is a flow diagram illustrating an example method for securing data for transmission to a wireless device.

FIG. 6 is a flow diagram 80 illustrating an example method 80 for securing data for transmission to a wireless device. The method 80 begins at step 82 when an electronic message or other data is received which is designated for delivery to a message recipient associated with a wireless device. In step 84, the method 80 determines if the received message is classified, as described above. If the message is not classified, then the method proceeds to step 90. Otherwise, if the message is classified, then the method 80 identifies the public encryption key associated with the message recipient at step 86. Then, the public encryption key is used at step 88 to encrypt a session key used by a stronger encryption algorithm to encrypt the outgoing message, as described above. At step 90, the message is transmitted to the wireless device over the wireless network.

Figure 7:
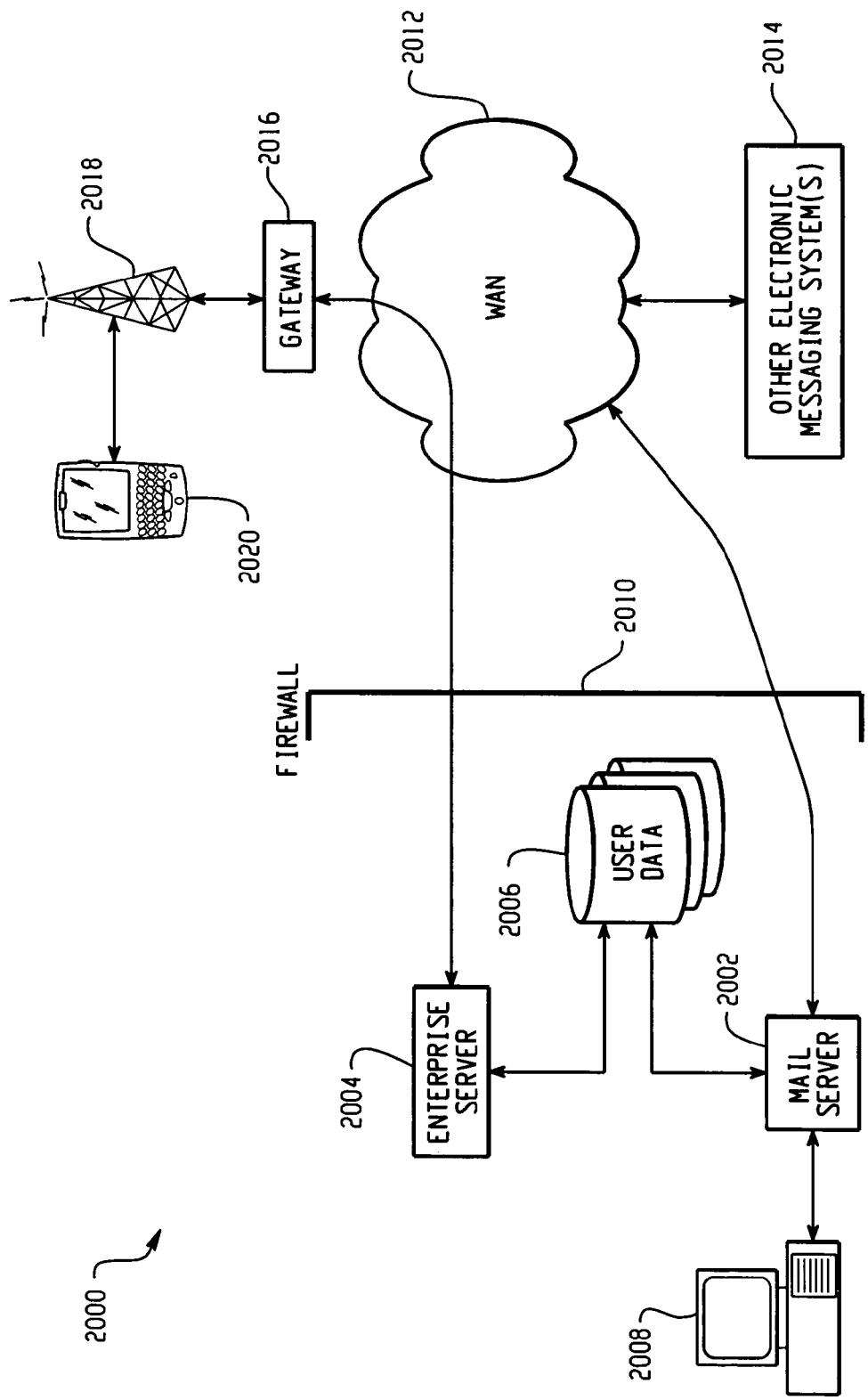
FIG. 7 is a block diagram of an example system for redirecting electronic messages or other data to and from a wireless device.

FIG. 7 is a block diagram of an example system for redirecting electronic messages or other data to and from a wireless device 2020. The example redirection system 2000 includes an enterprise server 2004, a mail server 2002, a storage medium 2006 for electronic messaging (e.g., e-mail) account data, and a wireless gateway 2016. Also illustrated are the wireless device 2020, a wireless network 2018, a wide area network (WAN) 2012, a firewall 2010, a desktop client 2008, and one or more other electronic messaging systems 2014.

The mail server 2002 may include electronic messaging software executing on a computer within a local area computer network (LAN). The mail server 2002 is coupled to local network devices 2004, 2006, 2008 via the LAN, and is coupled to remote network devices 2014, 2016 via the WAN 2012. The LAN and WAN 2012 may be separated by a firewall 2010.

The mail server 2002 maintains an electronic message account within the electronic message account database 2006 for each desktop client 2008 in the LAN. The electronic message account database 2006 may be one or more storage devices coupled to the mail server 2002, and may be included within the same network device as the mail server 2002 or in one or more separate devices within the LAN. The desktop client 2008 may be one of a plurality of computers (e.g., personal computers, terminals, laptop computers, or other processing devices) coupled to the mail server 2002 via the LAN that execute electronic messaging software to send and receive electronic messages via the mail server.

Electronic messages sent from the desktop client 2008 are stored by the mail server 2002 in an outgoing message storage location (an "outbox") within a corresponding electronic message account 2006. If the outgoing message is addressed to an electronic message account within the LAN, then the mail server 2002 delivers the message to an incoming message storage location (an "inbox") in the appropriate electronic message account 2006. If the outgoing message is addressed to an electronic message account in another electronic messaging system 2014, however, then the message is delivered via the WAN 2012. Similarly, incoming electronic message addressed to the electronic message account 2006 is received by the mail server 2002 and stored to the electronic message account database 2006 within the appropriate incoming message storage location ("inbox"). The incoming electronic message may then be retrieved from the electronic message account 2006 by the desktop client 2008, or may be automatically pushed to the desktop client 2008 by the mail server 2002.

The enterprise server 2004 may include electronic message redirection software executing on a computer within the LAN. The enterprise server 2004 is operational to redirect electronic messages from the electronic message account 2006 to the wireless device 2020 and to place messages sent from the wireless device 2020 into the electronic message account 2006 for delivery by the mail server 2002. The enterprise server 2004 stores wireless device information, such as a wireless identification (e.g., a PIN), used to communicate with the wireless device 2020. The enterprise server 2004 may, for example, communicate with the wireless device 2020 using a direct TCP/IP level connection with the wireless gateway 2016, which provides an interface between the WAN 2012 and the wireless network 2018.

When an electronic message is received in the inbox of the electronic message account 2006, the electronic message is detected by the enterprise server 2004, and a copy of the message and any necessary wireless device information are sent over the WAN 2012 to the wireless gateway 2016. For example, the enterprise server 2004 may encapsulate a copy of the message into one or more data packets along with a wireless identification (e.g., a PIN) for the wireless device 2020, and transmit the data packet(s) to the wireless gateway 2016 over a direct TCP/IP level connection. The wireless gateway 2016 may then use the wireless identification and/or other wireless device information to transmit the data packets(s) containing the electronic message over the wireless network 2018 to the wireless device 2020.

Electronic messages sent from the wireless device 2020 may be encapsulated into one or more data packets along with a network identification for the enterprise server 2004 and then transmitted over the wireless network 2018 to the wireless gateway 2016. The wireless gateway 2016 may use the network identification for the enterprise server 2004 to forward the data packet(s) over the WAN 2012 to the enterprise server 2004, preferably via a direct TCP/IP level connection. Upon receiving the data packet(s) from the wireless gateway 2016, the enterprise server 2004 places the enclosed electronic message into the outbox of the associated electronic message account 2006. The mail server 2002 then detects the electronic message in the outbox and delivers the message, as described above.

Security may be maintained outside of the firewall 2010 by encrypting all electronic messages sent between the enterprise server 2004 and the wireless device 2020. For instance, an electronic message to be redirected to the wireless device 2020 may be encrypted and compressed by the enterprise server 2004, and the encrypted message may then be encapsulated into one or more data packets for delivery to the wireless device 2020. To maintain security, the electronic message may remain encrypted over the entire communication path 2016, 2018, 2012 from the enterprise server 2004 to the wireless device 2020. Similarly, electronic messages sent from the wireless device 2020 may be encrypted and compressed by the wireless device 2020 before being packetized and transmitted to the enterprise server 2004, and may remain encrypted over the entire communication path 2016, 2018, 2012 from the wireless device 2020 to the enterprise server 2004.

In addition, the enterprise server 2004 may include a communication subsystem, a memory subsystem and a processing subsystem. The communication subsystem may be operable to communicate with the wireless gateway 2016 over the WAN 2012. The memory subsystem may be operable to store data and program information. The processing subsystem may be operable to store and retrieve data in the memory subsystem and execute programs stored in the memory subsystem, and to cause the communication subsystem to transmit and receive information over the WAN 2012.

Figure 8:
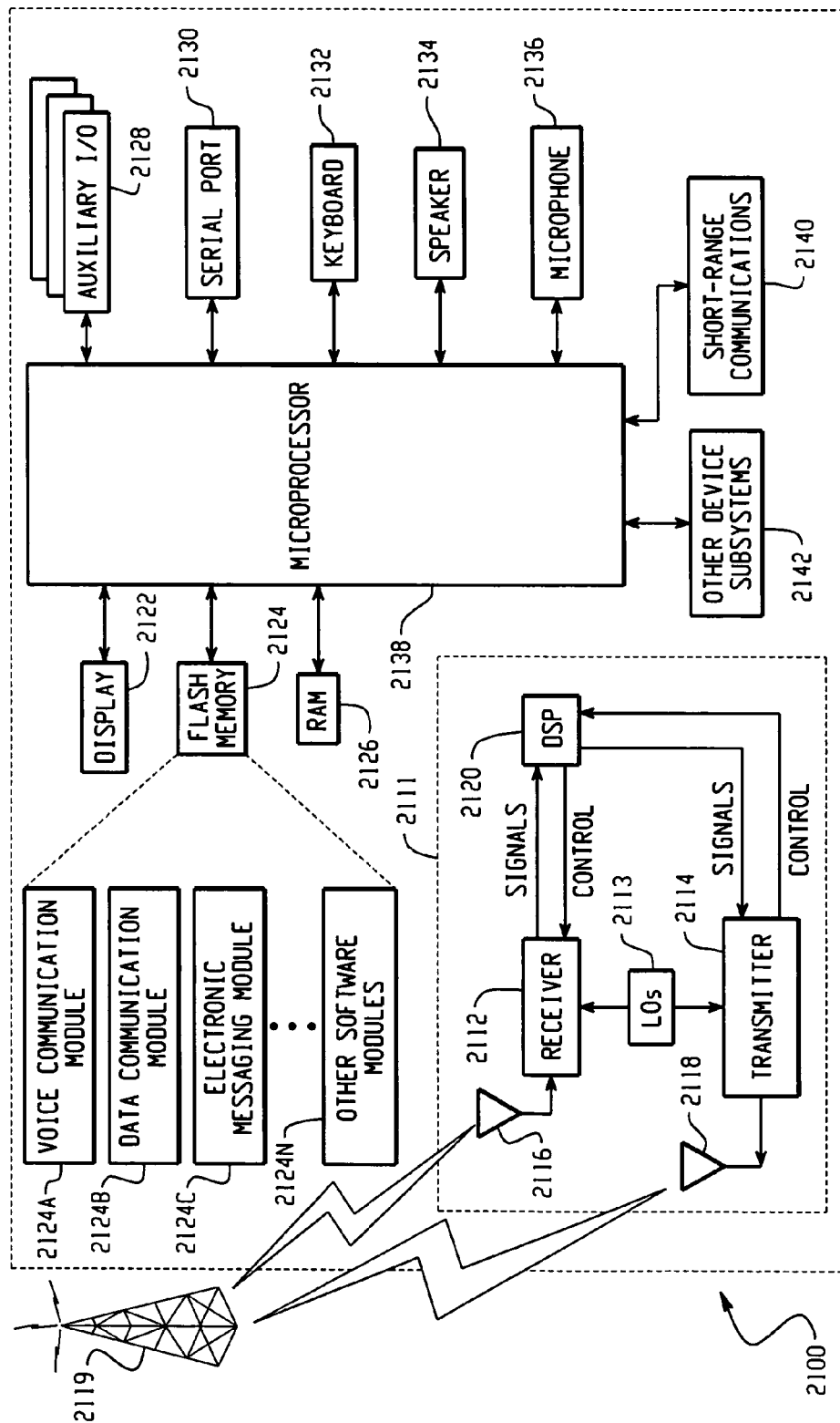
FIG. 8 is a block diagram illustrating an example wireless device.

FIG. 8 is a block diagram illustrating an example wireless device 2100. The wireless device 2100 includes a processing subsystem 2138, a communications subsystem 2111, a short-range communications subsystem 2140, a memory subsystem 2124, 2126, and various other device subsystems and/or software modules 2142. The wireless device 2100 also includes a user interface, which may include a display 2122, a serial port 2130, keyboard 2132, a speaker 2134, a microphone 2136, one or more auxiliary input/output devices 2128, and/or other user interface devices.

The processing subsystem 2138 controls the overall operation of the wireless device 2100. Operating system software executed by the processing subsystem 2138 may be stored in a persistent store, such as a flash memory 2124, but may also be stored in other types of memory devices in the memory subsystem, such as a read only memory (ROM) or similar storage element. In addition, system software, specific device applications, or parts thereof, may be temporarily loaded into a volatile store, such as a random access memory (RAM) 2126. Communication signals received by the wireless device 2100 may also be stored to RAM 2126.

The processing subsystem 2138, in addition to its operating system functions, enables execution of software applications 2124 on the device 2100. A predetermined set of applications that control basic device operations, such as data and voice communications, may be installed on the device 2100 during manufacture. In addition, a personal information manager (PIM) application, including an electronic messaging application, may be installed on the device. The PIM may, for example, be operable to organize and manage data items, such as e-mail, calendar events, voice mails, appointments, and task items. The PIM application may also be operable to send and receive data items via the wireless network 2119.

Communication functions, including data and voice communications, are performed through the communication subsystem 2111, and possibly through the short-range communications subsystem 2140. The communication subsystem 2111 includes a receiver 2112, a transmitter 2114 and one or more antennas 2116, 2118. In addition, the communication subsystem 2111 also includes a processing module, such as a digital signal processor (DSP) 2120 or other processing device(s), and local oscillators (LOs) 2113. The specific design and implementation of the communication subsystem 2111 is dependent upon the communication network in which the wireless device 2100 is intended to operate. For example, a wireless device 2100 may include a communication subsystem 2111 designed to operate within the Mobitex™ wireless system, the DataTAC™ wireless system, a GSM network, a GPRS network, a UMTS network, and/or an EDGE network.

Network access requirements vary depending upon the type of communication system. For example, in the Mobitex and DataTAC networks, wireless devices are registered on the network using a unique personal identification number or PIN associated with each device. In UMTS and GSM/GPRS networks, however, network access is associated with a subscriber or user of a device. A GPRS device therefore requires a subscriber identity module, commonly referred to as a SIM card, in order to operate on a GSM/GPRS network.

When required network registration or activation procedures have been completed, the wireless device 2100 may send and receive communication signals over the communication network 2119. Signals received by the antenna 2116 from the communication network 2119 are routed to the receiver 2112, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 2119 are processed (e.g., modulated and encoded) by the DSP 2120 and are then provided to the transmitter 2114 for digital to analog conversion, frequency up conversion, filtering, amplification and transmission to the communication network 2119 (or networks) via the antenna 2118.

In addition to processing communication signals, the DSP 2120 provides for receiver 2112 and transmitter 2114 control. For example, gains applied to communication signals in the receiver 2112 and transmitter 2114 may be adaptively controlled through automatic gain control algorithms implemented in the DSP 2120.

In a data communication mode, a received signal, such as a text message or web page download, is processed by the communication subsystem 2111 and input to the processing device 2138. The received signal is then further processed by the processing device 2138 for output to a display 2122, or alternatively to some other auxiliary I/O device 2128. A device user may also compose data items, such as e-mail messages, using a keyboard 2138 and/or some other auxiliary I/O device 2128, such as a touchpad, a rocker switch, a thumb-wheel, or some other type of input device. The composed data items may then be transmitted over the communication network 2119 via the communication subsystem 2111.

In a voice communication mode, overall operation of the device is substantially similar to the data communication mode, except that received signals are output to a speaker 2134, and signals for transmission are generated by a microphone 2136. Alternative voice or audio I/O subsystems, such as a voice message recording subsystem, may also be implemented on the device 2100. In addition, the display 2122 may also be utilized in voice communication mode, for example, to display the identity of a calling party, the duration of a voice call, or other voice call related information.

The short-range communications subsystem 2140 enables communication between the wireless device 2100 and other proximate systems or devices, which need not necessarily be similar devices. For example, the short-range communications subsystem 2140 may include an infrared device and associated circuits and components, or a Bluetooth™ communication module to provide for communication with similarly-enabled systems and devices.

This written description uses examples to disclose the invention, including the best mode, and also to enable a person skilled in the art to make and use the invention. The patentable scope of the invention may include other examples that occur to those skilled in the art.

What is claimed is:

1. A method performed within a protected network for redirecting electronic messages for transporting over a wireless network to a wireless device, the method comprises:
   determining when an electronic message that is protected with a first encryption algorithm is to be redirected over the wireless network to the wireless device based on information within the electronic message, the wireless network being external to the protected network;
   when the electronic message is to be redirected over the wireless network, the method comprises:
   converting the protected electronic message to a data structure that is recognizable by the wireless device;
   encrypting the data structure with a second encryption algorithm using a random session key, the second encryption algorithm having a stronger security than the first encryption algorithm;
   encrypting the random session key with a public key; and
   transmitting packets that comprise the encrypted data structure and the encrypted random session key to the wireless device over the wireless network, and
   when the electronic message is not to be redirected over the wireless network, the method comprises:
   refraining from converting the protected electronic message, refraining from encrypting the data structure, refraining from encrypting the random session key and refraining from transmitting the packets over the wireless network; and
   sending the protected electronic message to a destination within the protected network.

2. The method of claim 1 wherein the electronic message is protected with the first encryption algorithm by at least one of a digital signature and encryption.

3. The method of claim 2 further comprising determining wireless device identification information associated with the wireless device from the electronic message,
   wherein the electronic message is converted to the data structure based at least in part on the wireless device identification information to be recognizable by the wireless device.

4. The method of claim 3 further comprising retrieving the public key from a public key look-up database that is associated with the wireless device and generating the random session key.

5. The method of claim 4 further comprising encapsulating the encrypted data structure and the encrypted random session key into one or more data packets along with the wireless identification information for transmission to the wireless device over the wireless network.

6. The method of claim 5 wherein transmitting comprises communicating with the wireless device using a higher-level connection with a wireless gateway that provides an interface with the wireless network.

7. The method of claim 6 further comprising receiving the electronic message by an enterprise server from an electronic messaging server, the electronic message being addressed to a message recipient in a wired local area network, the message recipient having an associated wireless device operable in the wireless network,
   wherein the enterprise server has the wireless device identification information of the associated wireless device stored therein for use in communicating with the wireless device using the higher-level connection with a wireless gateway that provides an interface with the wireless network.

8. The method of claim 6 wherein the second encryption algorithm is a symmetric algorithm, and
wherein the gateway is configured to utilize the wireless device identification information to transmit the data packets containing the electronic message over the wireless network to the associated wireless device.

9. A system arranged to operate within a protected network to redirect electronic messages over a wireless network to a wireless device, the system comprising:
a wireless network interface to provide connectivity to the wireless network; and
processing circuitry to:
determining when an electronic message that is protected with a first encryption algorithm is to be redirected over the wireless network to the wireless device based on information within the electronic message, the wireless network being external to the protected network; and
when the electronic message is to be redirected over the wireless network, the processing circuitry is arranged to:
convert the electronic message to a data structure that is recognizable by the wireless device;
encrypt the data structure with a second encryption algorithm using a random session key, the second encryption algorithm having a stronger security than the first encryption algorithm; and
encrypt the random session key with a public key,
wherein the network interface is configured by the processing circuitry to transmit packets that comprise the encrypted data structure and the encrypted random session key to the wireless device over the wireless network, and
when the electronic message is not to be redirected over the wireless network, the processing circuitry is arranged to:
refrain from converting the protected electronic message, refrain from encrypting the data structure, refrain from encrypting the random session key and refrain from transmitting the packets over the wireless network; and
send the protected electronic message to a destination within the protected network.

10. The system of claim 9 wherein the electronic message is protected with the first encryption algorithm by at least one of a digital signature and encryption.

11. The system of claim 10 wherein the processing circuitry is configured to determine wireless device identification information associated with the wireless device from the electronic message,
wherein the electronic message is converted to the data structure based at least in part on the wireless device identification information to be recognizable by the wireless device.

12. The system of claim 11 wherein the system is configured to retrieve the public key from a public key look-up database that is associated with the wireless device and generate the random session key.

13. The system of claim 12 wherein the processing circuitry is configured to encapsulate the encrypted data structure and the encrypted random session key into one or more data packets along with the wireless identification information for transmission to the wireless device over the wireless network.

14. The system of claim 13 wherein the wireless network interface is configured for communicating with the wireless device using a higher-level connection with a wireless gateway that provides an interface with the wireless network.

15. The system of claim 14 further comprising a wireless local area network interface configured to receive the electronic message from an electronic messaging server, the electronic message being addressed to a message recipient in a wired local area network, the message recipient having an associated wireless device operable in the wireless network,
wherein the system includes an enterprise server that has the wireless device identification information of the associated wireless device stored therein for use in communicating with the wireless device using the higher-level connection with a wireless gateway that provides an interface with the wireless network.

16. The system of claim 14 wherein the second encryption algorithm is a symmetric algorithm, and
wherein the gateway is configured to utilize the wireless device identification information to transmit the data packets containing the electronic message over the wireless network to the associated wireless device.

17. A server system comprising:
a wireless network interface that operates behind a firewall within a protected network and provides connectivity to a wireless network;
a local-area network interface that provides connectivity to a local area network, the local-area network interface to receive an electronic message that is protected with a first encryption algorithm for transporting over the wireless network to a wireless device; and
processing circuitry arranged to:
determine when the electronic message is to be redirected over the wireless network to the wireless device based on information within the electronic message, the wireless network being external to the protected network; and
when the electronic message is to be redirected over the wireless network, the processing circuitry is arranged to:
convert the protected electronic message to a data structure that is recognizable by the wireless device when it is determined that the electronic message is to be transported over the wireless network to the wireless device, encrypt the data structure with a second encryption algorithm using a random session key, the second encryption algorithm having a stronger security than the first encryption algorithm, and encrypt the random session key with a public key,
wherein the wireless network interface is configured by the processing circuitry to transmit packets that comprise the encrypted data structure and the encrypted random session key to the wireless device over the wireless network, and
when the electronic message is not to be redirected over the wireless network, the processing circuitry is arranged to:
refrain from converting the protected electronic message, refrain from encrypting the data structure, refrain from encrypting the random session key and refrain from transmitting the packets over the wireless network; and
send the protected electronic message to a destination within the protected network.

18. The server system of claim 17 wherein the wireless network interface is configured for communicating with the wireless device using a higher-level connection with a wireless gateway that provides an interface with the wireless network.

19. The server system of claim 18 wherein the processing circuitry is configured to determine wireless device identification information associated with the wireless device from the electronic message, and
wherein the electronic message is converted to the data structure based at least in part on the wireless device identification information to be recognizable by the wireless device.

20. The server system of claim 19 wherein the second encryption algorithm is a symmetric algorithm, and
    wherein the gateway is configured to utilize the wireless device identification information to transmit the data packets containing the electronic message over the wireless network to the associated wireless device.

21. The server system of claim 20 wherein the system is configured to retrieve the public key from a public key lookup database that is associated with the wireless device and generate the random session key, and
    wherein the processing circuitry is configured to encapsulate the encrypted data structure and the encrypted random session key into one or more data packets along with the wireless identification information for transmission to the wireless device over the wireless network.

\* \* \* \* \*